US012596444B2

(12) United States Patent
Keller et al.

(10) Patent No.: US 12,596,444 B2
(45) Date of Patent: Apr. 7, 2026

(54) HEAD MOUNTED DISPLAY SYSTEM HAVING AN INTERACTIVE RETICLE FOR CONTROLLING CONNECTED DEVICES

(71) Applicant: Vuzix Corporation, West Henrietta, NY (US)

(72) Inventors: Brent Keller, Rochester, NY (US); Adam C. Gogolski, Fairport, NY (US); Paul J. Travers, Honeoye Falls, NY (US)

(73) Assignee: Vuzix Corporation, West Henrietta, NY (US)

( * ) Notice: Subject to any disclaimer, the term of this patent is extended or adjusted under 35 U.S.C. 154(b) by 0 days.

(21) Appl. No.: 18/293,701

(22) PCT Filed: Jul. 29, 2022

(86) PCT No.: PCT/US2022/038950
§ 371 (c)(1),
(2) Date: Jan. 30, 2024

(87) PCT Pub. No.: WO2023/009864
PCT Pub. Date: Feb. 2, 2023

(65) Prior Publication Data
US 2024/0338089 A1      Oct. 10, 2024

Related U.S. Application Data

(60) Provisional application No. 63/227,804, filed on Jul. 30, 2021.

(51) Int. Cl.
*G06F 3/038*        (2013.01)
*G06F 3/01*         (2006.01)
(Continued)

(52) U.S. Cl.
CPC ............ *G06F 3/0383* (2013.01); *G06F 3/013* (2013.01); *G06F 3/017* (2013.01); *G06F 3/0482* (2013.01);
(Continued)

(58) Field of Classification Search
CPC ...................................................... G06F 3/0383
(Continued)

(56) References Cited

U.S. PATENT DOCUMENTS

| 9,678,654 B2 | 6/2017 | Wong et al. | |
| 10,732,721 B1 * | 8/2020 | Clements | ................ B66B 1/468 |

(Continued)

FOREIGN PATENT DOCUMENTS

| JP | 2017120556 A | 7/2017 |
| JP | 2018063722 A | 4/2018 |

(Continued)

OTHER PUBLICATIONS

Teo et al. (2019) "Investigating the use of Different Visual Cues to Improve Social Presence within a 360 Mixed Reality Remote Collaboration," Proceedings of the Web Conference 2020, New York, NY: 1-9.

(Continued)

*Primary Examiner* — Long D Pham
(74) *Attorney, Agent, or Firm* — Harter Secrest & Emery LLP; Jacob D. Merrill, Esq.

(57) ABSTRACT

A head-mounted near-eye display system for controlling a network-connected device, including an image light guide operable to convey image-bearing light beams from an image source to an eyebox within which a virtual image can be viewed, the image source operable to form a reticle within the virtual image. A user input mechanism operable to control the reticle such that the reticle may be visually superimposed over the network-connected device, wherein (Continued)

the network-connected device is operable to receive commands to change state over the network, and wherein the user input mechanism is operable to select the network-connected device when the reticle is visually superimposed over the network-connected device, whereby the state of the network-connected device is operable to be changed.

20 Claims, 14 Drawing Sheets

(51) Int. Cl.
*G06F 3/0482* (2013.01)
*G06F 3/16* (2006.01)
(52) U.S. Cl.
CPC ...... *G06F 3/167* (2013.01); *G06F 2203/0384* (2013.01)
(58) Field of Classification Search
USPC ........................................................ 345/156
See application file for complete search history.

(56) References Cited

U.S. PATENT DOCUMENTS

| | | | | |
|---|---|---|---|---|
| 2014/0160001 | A1* | 6/2014 | Kinnebrew | G06F 3/0482 |
| | | | | 345/156 |
| 2015/0156803 | A1* | 6/2015 | Ballard | H04N 23/635 |
| | | | | 455/422.1 |
| 2015/0317518 | A1* | 11/2015 | Fujimaki | G02B 27/017 |
| | | | | 345/633 |

| | | | |
|---|---|---|---|
| 2016/0033233 | A1 | 2/2016 | Hakanson et al. |
| 2017/0092235 | A1 | 3/2017 | Osman et al. |
| 2018/0043263 | A1 | 2/2018 | Cao |
| 2018/0204385 | A1* | 7/2018 | Sarangdhar .......... H04L 12/282 |
| 2019/0073800 | A1 | 3/2019 | Lochny |
| 2019/0114835 | A1 | 4/2019 | Costa et al. |
| 2019/0228370 | A1 | 7/2019 | Lien |
| 2019/0285896 | A1 | 9/2019 | Kobayashi et al. |
| 2019/0385342 | A1 | 12/2019 | Freeman et al. |
| 2019/0392643 | A1 | 12/2019 | Busto et al. |
| 2020/0210127 | A1 | 7/2020 | Browy |
| 2020/0402320 | A1 | 12/2020 | Crews et al. |
| 2020/0409532 | A1 | 12/2020 | Murphy et al. |

FOREIGN PATENT DOCUMENTS

| | | | |
|---|---|---|---|
| JP | 2018073071 | A | 5/2018 |
| JP | 2019121102 | A | 7/2019 |
| JP | 2021501397 | A | 1/2021 |
| WO | 2018186031 | A1 | 10/2018 |
| WO | 2018204072 | A1 | 11/2018 |
| WO | 2020222871 | A1 | 11/2020 |
| WO | 2022072854 | A1 | 4/2022 |

OTHER PUBLICATIONS

Teo et al. (2019) "Merging Live and Static 360 Panoramas Inside a 3D Scene for Mixed Reality Remote Collaboration," IEEE International Symposium on Mixed and Augmented Reality Adjunct: 22-25.

* cited by examiner

HEAD MOUNTED DISPLAY SYSTEM HAVING AN INTERACTIVE RETICLE FOR CONTROLLING CONNECTED DEVICES

CROSS-REFERENCE TO RELATED APPLICATIONS

This patent application is a U.S. national phase application under 35 U.S.C. § 371 and claims the priority benefit of International Patent Application No. PCT/US2022/038950, filed Jul. 29, 2022, which claims the priority benefit of U.S. Provisional Patent Application No. 63/227,804, filed Jul. 30, 2021, each of which is incorporated herein by reference in its entirety for all purposes.

TECHNICAL FIELD

The present disclosure relates generally to electronic AR/VR displays and more particularly to displays utilizing an image light guide and operable to display virtual and real-world interactions.

BACKGROUND

Head mounted near-eye display systems are being developed for a range of diverse uses, including military, commercial, industrial, fire-fighting, and entertainment applications. For many of these applications, there is value in forming a virtual image that can be visually superimposed over the real-world image that lies in the field of view of the user. An optical image light guide may convey image-bearing light to a viewer in a narrow space for directing the virtual image to the viewer's pupil and enabling this super-imposition function.

Head mounted near-eye display systems provide operators with a variety of virtual images and icons. It would also be beneficial to provide operators with the ability to interact with real world objects, including but not limited to networked devices in a smart home.

SUMMARY

For purposes of illustration and not by way of limitation, the present disclosure provides a system and method of displaying and controlling a virtual image reticle or alignment guide. In addition, the present disclosure describes an optical system having a virtual reticle that enables an operator to recognize, select and control external systems.

The reticle system includes a wearable near-eye display system having a camera or other visual input device, and an image source, and may include various user input controls and a processing unit connected therewith. The reticle system displays a virtual image reticle, such as a crosshair or bounding box, and may have its color, shape, position and input element configured to the preferences of the user. The system further provides a variety of means for the operator to use and control the reticle and execute commands. Further, control of the reticle may be operable for a remote user.

When networked with systems, devices, objects, or programs operable to receive commands from a near-eye display system, the reticle system may enable the operator to initiate commands, and receive information from said external systems, objects, or programs.

The novel reticle system and method also encompass specifications for interacting with, sending commands to, and receiving data from other devices and systems such as an internet of things (IOT) device.

In one aspect, a head-mounted display system for controlling a network-connected device with a reticle is provided. The system comprises a network-connected device operable to receive commands to change state over a communication network; a transmissive waveguide for forming a virtual image display, wherein the virtual image display is operable to generate a reticle; and a user input mechanism for controlling the reticle such that it may be visually superimposed over the network-connected device. In another aspect, the user input mechanism is configured to select the network-connected device when the reticle is visually superimposed over it, thereby enabling the head-mounted display system to change the state of the network-connected device. The system may include a virtual menu on the virtual image display, wherein the virtual menu includes a plurality of selectable options associated with the network-connected device, and the reticle may be visually superimposed over one or more of those options, and the reticle is operable to select or deselect one or more of those options to change the state of the network-connected device.

In other aspects, the network-connected device changes state when the reticle is visually superimposed over said network-connected device for a desired period of time; the reticle appears in the virtual image when preview is disabled; the reticle may be assigned different properties including color, shape, orientation, form and the like; the head-mounted display system is operable to select, deselect, control, move, or otherwise affect a virtual menu or other selectable virtual object via locating the reticle within the virtual image; and/or the head-mounted display system is operable to activate, deactivate, control or otherwise change the state of a networked IOT object via visually superimposing the reticle over the networked IOT object.

The reticle may be in the forms of a crosshair or a bounding box representing the field of view of an associated camera or other visual input device. The reticle may be assigned to a real-world object like a finger or stylus such that movement of the reticle corresponds to movement of the finger or stylus. The system may comprise a second reticle which operates independently of the first reticle or interacts with the first reticle. The user-input mechanism may be a user input button, a touch sensor, a voice command, or a facial gesture or movement captured by an operator-facing camera.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

DETAILED DESCRIPTION

Figure 1A:
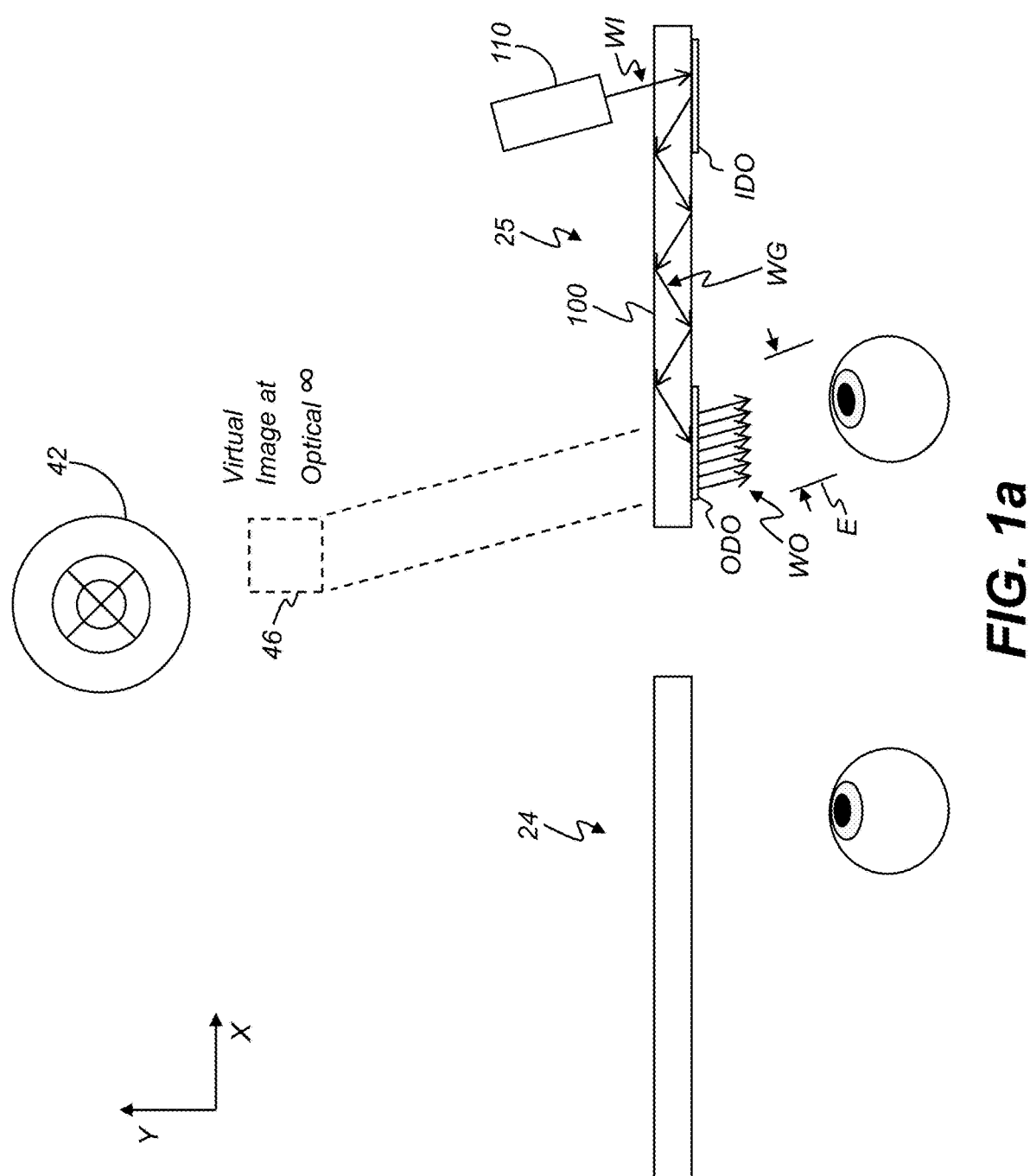
FIG. 1a is a schematic top view of an image light guide having an in-coupling diffractive optic and out-coupling diffractive optic providing an expanded eyebox for the viewer according to an exemplary embodiment of the presently disclosed subject matter.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Where they are used herein, the terms "first," "second," and so on, do not necessarily denote any ordinal, sequential, or priority relation, but are simply used to more clearly distinguish one element or set of elements from another, unless specified otherwise.

Where used herein, the term "exemplary" is meant to convey "an example of," and is not intended to suggest any preferred or ideal embodiment.

Where used herein, the terms "viewer," "operator," "observer," and "user" are considered to be equivalent and refer to the person who views virtual images conveyed by one of the considered image light guides, especially as arranged in an optical viewing device.

Where used herein, the term "actuable" has its conventional meaning, relating to a device or component that is capable of effecting an action in response to a stimulus, such as in response to an electrical signal, for example.

Where used herein, the term "set," as used herein, refers to a non-empty set, as the concept of a collection of elements or members of a set is widely understood in elementary mathematics. The term "subset," unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

Where used herein, the term "reticle" refers to a virtual image that is generated by a projector/image source of a near-eye display system. The reticle may take the shape of, but is not limited to, a crosshair, pointer, bounding box or other visually identifiable form, that may be visually superimposed over a real object or virtual image, that may be used in the execution of commands issued from the head mounted near-eye display system. The bounding box may show the outer edges of the virtual image, or simply a center alignment point. The size and shape of the bounding box may be adjusted in the virtual image as the zoom level of the camera is adjusted.

An optical system, such as a head mounted near-eye display system, can produce a virtual image via an image source. In contrast to methods for forming a real image, a virtual image is not formed on a display surface. That is, if a display surface were positioned at the perceived location of a virtual image, no image would be formed on that surface. Virtual images have a number of inherent advantages for augmented reality presentation. For example, the apparent size of a virtual image is not limited by the size or location of a display surface. Additionally, the source object for a virtual image may be small; for example, a magnifying glass provides a virtual image of an object. In comparison with systems that project a real image, a more realistic viewing experience can be provided by forming a virtual image that appears to be some distance away. Providing a virtual image also obviates the need to compensate for screen artifacts, as may be necessary when projecting a real image.

Turning now to the drawings, head mounted near-eye display systems have a range of diverse uses, including military, commercial, industrial, fire-fighting, and entertainment applications. As described herein, a head mounted near-eye display system is operable to form a virtual color image that can be visually superimposed over the real-world that lies in the field of view of the head mounted near-eye display system user. Turning now to FIG. 1a, an optically transparent flat parallel plate waveguide 100, also called a planar waveguide, conveys image-bearing light WI generated by a polychromatic, or monochromatic, projector system 110 to the HMD user. The planar waveguide 100 may convey the image-bearing light WI in a narrow space to direct the image to the HMD user's pupil and enable the superposition of a virtual image 46 over a real object that lies in the field of view of the HMD user.

Collimated, relatively angularly encoded light beams from the color image projector source 110 may be coupled into the optically transparent planar waveguide 100 by an input coupling optic, such as an in-coupling diffractive optic IDO, which can be mounted or formed on a surface of the parallel plate planar waveguide 100 or disposed within the waveguide 100. Such diffractive optics can be formed as, but are not limited to, diffraction gratings or holographic optical elements. For example, the diffraction grating can be formed as a surface relief grating. After propagating along the planar waveguide 100, the diffracted color image-bearing light WG can be directed back out of the planar waveguide 100 by a similar output coupling optic, such as an out-coupling diffractive optic ODO, which may be arranged to provide pupil expansion along one or more directions. In addition, one or more diffractive turning gratings may be positioned along the waveguide 100 optically between the input and output gratings IDO, ODO to provide pupil expansion in one or more directions. The image-bearing light WO output from the parallel plate planar waveguide 100 provides an expanded eyebox E for the viewer. The waveguide 100 is illustrated in the right eye assembly 25 of the head mounted near-eye display system, but may be positioned in the left eye assembly 24 or both eye assemblies 24, 25.

Figure 1B:
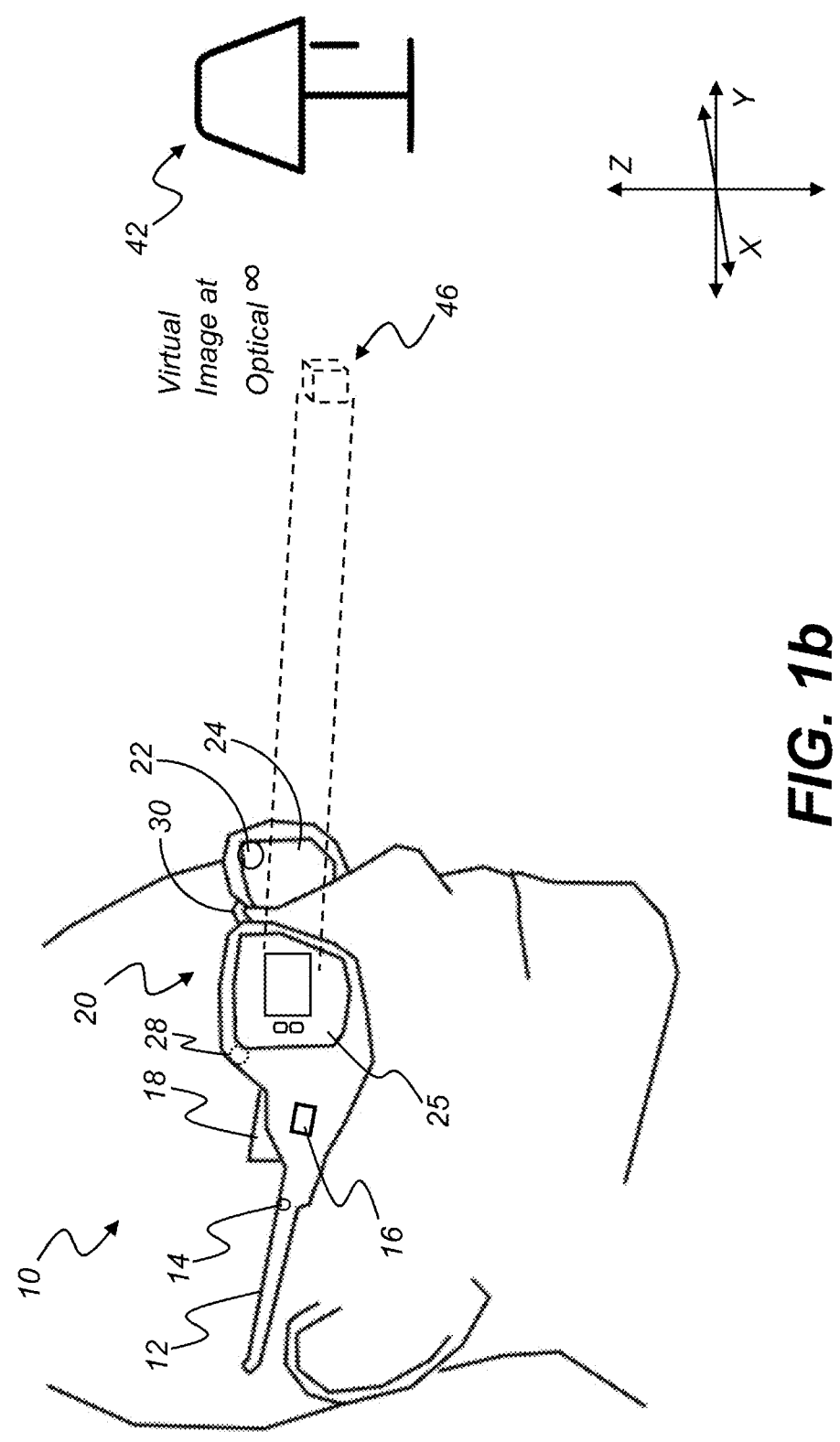
FIG. 1b illustrates a schematic of a person wearing a head mounted near-eye display system according to an exemplary embodiment of the presently disclosed subject matter.

FIG. 1b illustrates a head mounted near-eye display system 20 in the form of eyeglasses (i.e., smart glasses) in one embodiment of the reticle system. The head mounted near-eye display system 20 may include at least a right temple arm 12 and a processing unit 18 having a memory for storing data, storing computer programs, storing computer apps, and for executing the computer programs and apps. Additionally, the processing unit 18 may be connected to an input device 16 and/or user input button 14. The input device 16 is operable to convey user input to processing unit 18. In an embodiment, the input device 16 is a touchpad or touch sensor. The touch sensor 16 is operable to receive input from one or more fingers of a user 10 and/or input from a stylus. Persons skilled in the relevant arts will recognize that where an input gesture is described as being performed by a finger of the operator 10, the input gesture may also be performed by a stylus. A gesture received by the touch sensor 16 may include, without limitation, tapping the touch sensor 16, swiping/dragging across the touch sensor 16 in a front-to-rear direction, swiping/dragging across the touch sensor 16 in a rear-to-front direction, swiping/dragging across the touch sensor 16 in a top-to-bottom direction, swiping/dragging across the touch sensor 16 in a bottom-to-top direction, swiping/dragging across the touch sensor 16 in a front-to-rear and rear-to-front direction simultaneously (e.g., a pinching motion), and vice versa, swiping/dragging across the touch sensor 16 in a bottom-to-top and a top-to-bottom direction simultaneously, and vice versa, swiping/dragging across the touch sensor 16 in a front-to-rear-to-front direction, swiping/dragging across the touch sensor 16 in a rear-to-front-to-rear direction, and swiping/dragging across the touch sensor 16 in a bottom-to-top-to-bottom direction, and swiping/dragging across the touch sensor 16 in a top-to-bottom-to-top direction. The touch sensor 16 may further detect whether one finger, two fingers, or three fingers are utilized during the gesture. In an embodiment, a user input button 14 is operable to convey commands to processing unit 18. In another embodiment, the operator 10 can send commands via a handheld device or voice input. The processing unit 18 may convert the operator 10 interaction with the user input button 14, or the sequence of gestures into a sequence of symbols suitable for comparison with a stored sequence of symbols used to control certain operations on the device, including turning on/off the camera, camera focus, displaying and hiding the virtual image, enabling or disabling computer programs, controlling computer programs, enabling or disabling visual guides, controlling visual guides, selecting and controlling menu items, selecting and controlling networked real world objects and devices 42, and the like.

The head mount near-eye display system 20 may include augmented reality (AR) monocular or binocular smart glasses having the ability to display virtual images 46 to the wearer's eye(s), and may be connected to an external processing unit (e.g., a smart phone) that may run software to, at least in part, control the display of said virtual image(s) 46 and/or the display of a reticle in the virtual image 46. Additionally, or alternatively, the head mount near-eye display system 20 may include a processing unit suitable to control the display of virtual images 46.

The head mounted near-eye display system 20 may show a virtual image 46 preview of what the camera 22 sees. The camera 22 may be operable via a user input button 14, touch sensor 16, gestures, or verbal commands to enable the operator 10 to initiate a plurality of tasks including taking photos, recording video, two way calling, scanning barcodes, selecting and controlling networked real world objects and devices 42, and the like.

In an embodiment, the head mounted near-eye display system 20 may further comprise at least one camera 22 situated to view hand gestures of the user 10, and real objects in the FOV. In an embodiment, the camera 22 is located adjacent to the outer periphery of the left or right eye assembly 24, 25 of the head mounted near-eye display system. The camera 22 FOV is generally located in front of the operator 10. In another embodiment, the camera 22 is located in the left or right temple arm 12 of the head mounted near-eye display system 20. The camera 22 FOV is generally positioned facing to the front of the operator 10. In another embodiment, the camera 22 or additional cameras may augment the head mounted near-eye display system 20 FOV with additional orientations such as areas above, behind, or to the side of the operator 10.

In an embodiment, the head mounted near-eye display system 20 may further comprise at least one operator-facing camera 28 situated to view facial movements of the operator 10, including blinking, winks, eye movements, lip movements, facial expressions and the like which may be used to initiate control certain operations on the device, including turning on/off the camera, camera focus, displaying and hiding the virtual image display, annotating a virtual image display, enabling or disabling computer programs, controlling computer programs, enabling or disabling visual guides, controlling visual guides, selecting and controlling menu items on a virtual menu, selecting and controlling networked items and devices 42 in the real world, such as IOT devices and the like. In an embodiment, as illustrated in FIGS. 2a-3a and 3c, an operator-facing camera 28 is located on the left or right eye assembly 24, 25 eyeglass frame. In FIGS. 2a-3a and 3C, a first operator-facing camera 28 is shown located adjacent to the left temple arm 12, and a second operator-facing camera 28 is shown located on the lower portion of the left eye assembly 24 eyeglass frame.

Figure 2A:
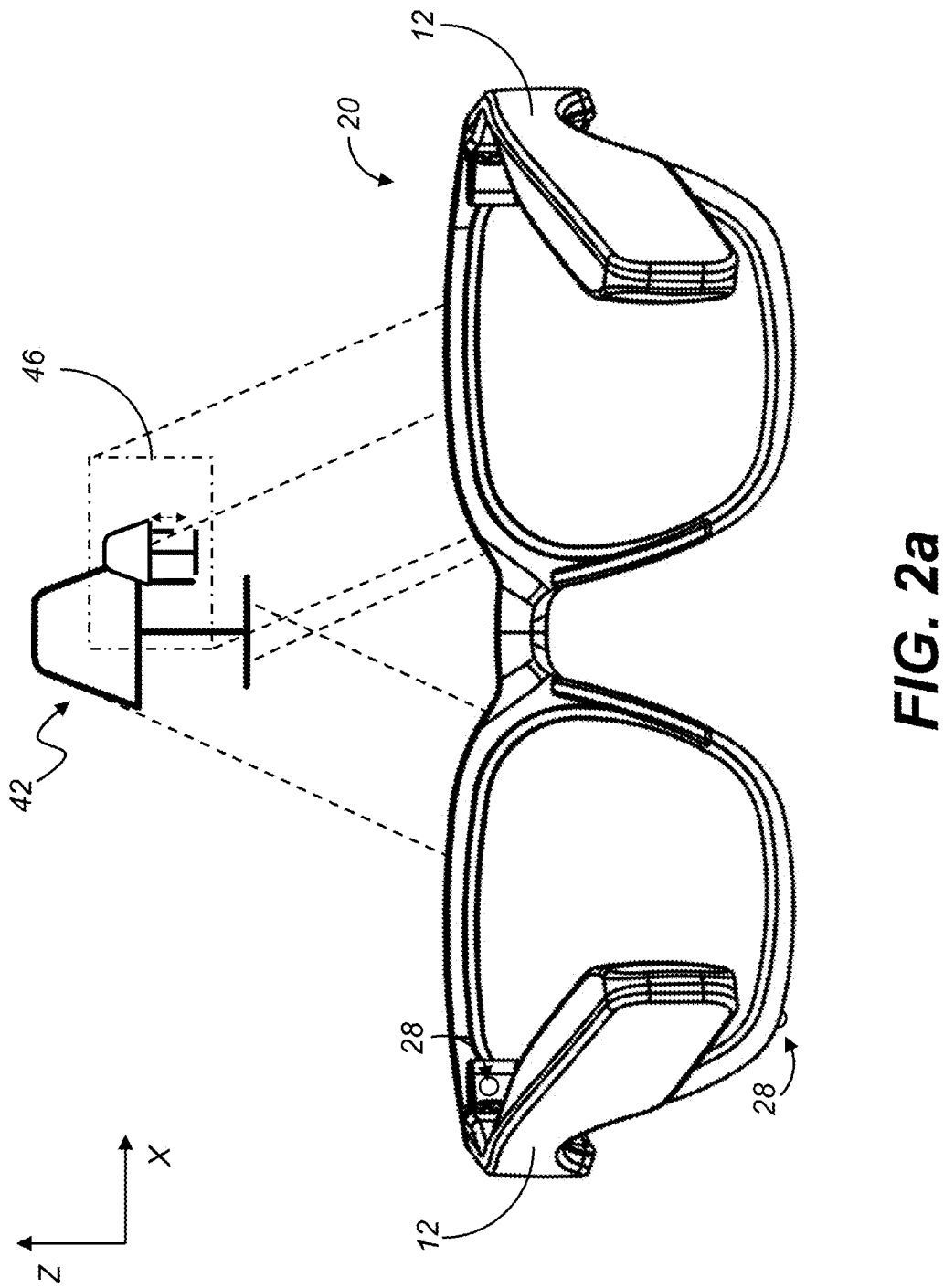
FIG. 2a illustrates a schematic of a camera-generated image of a real world object, as conveyed through a head mounted near-eye display system according to an exemplary embodiment of the presently disclosed subject matter.

Referring now to FIG. 2a, in an embodiment, a real world object 42 is captured by the camera 22 and a virtual image 46 of it is displayed via the head mounted near-eye display system 20. The virtual image 46 is located, in this example, at optical infinity via an eyebox for the right eye generated by the waveguide 100 of the right eye assembly 25 in conjunction with the other optical components of the head mounted near-eye display system 20. In another embodiment, the virtual image 46 is located at optical infinity via an eyebox for the left eye generated by the waveguide 100 of the left eye assembly 24 in conjunction with the other optical components of the head mounted near-eye display system 20. In still another embodiment, the virtual image 46 is located at optical infinity via right eye and left eye waveguides 100 in conjunction with the other optical components of a binocular head mounted near-eye display system 20. The camera 22 is operable to focus upon objects, scan documents and items, read bar codes and other digitally encoded machine-readable optical labels, digitally record a photograph, record video of the real world object 42, and the like. Camera captured imagery may be displayed in the virtual image 46.

Figure 2B:
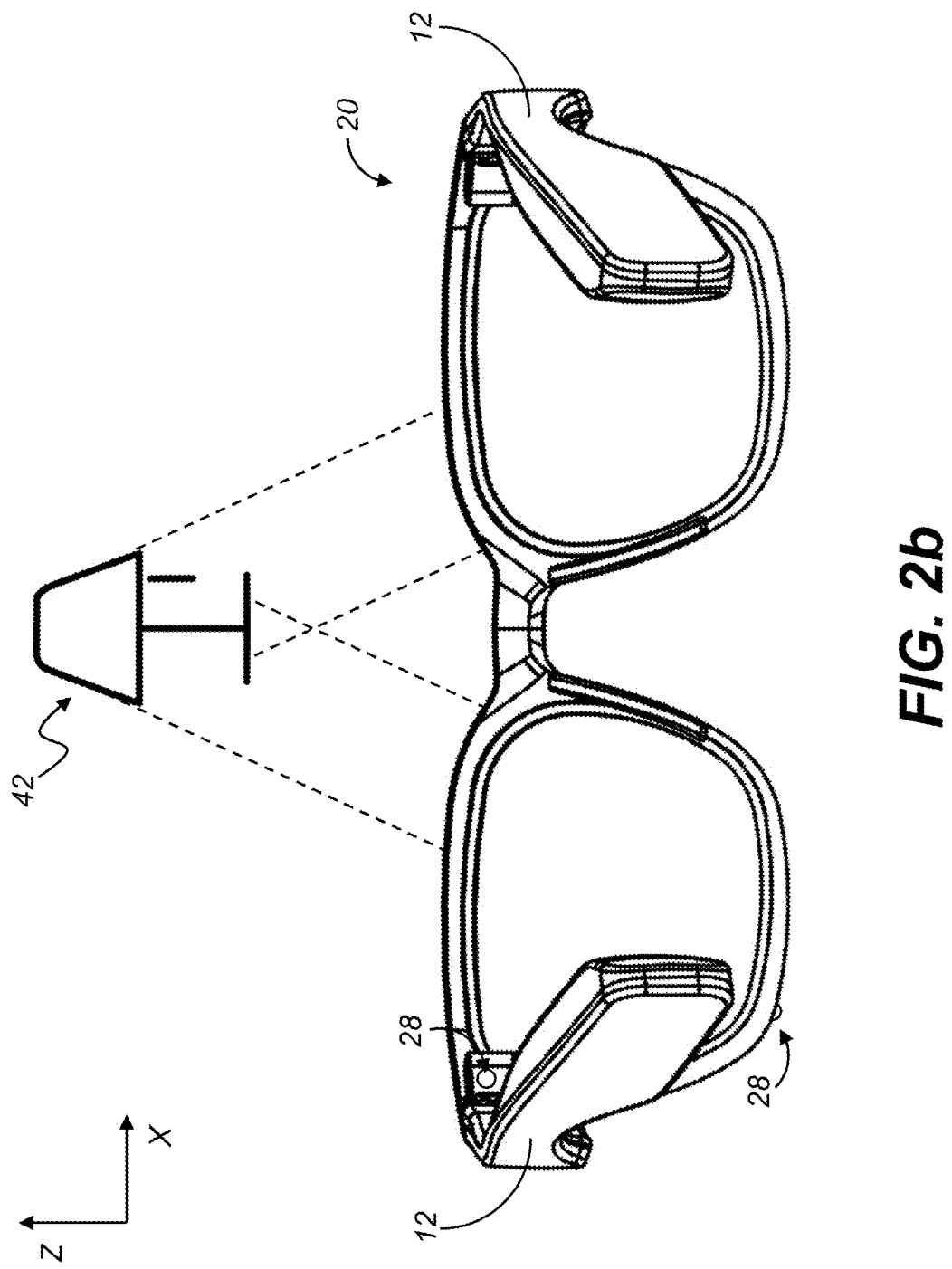
FIG. 2b illustrates a schematic of a real world object, as viewed through a head mounted near-eye display system according to an exemplary embodiment of the presently disclosed subject matter.

In FIG. 2b, the virtual image 46 is disabled, allowing an observer 10 to view the real world object 42 unobstructed. In another embodiment, the head mounted near-eye display system 20 further comprises one or more corrective lenses allowing operator 10 to view the real world as with ordinary corrective glasses.

Figure 3A:
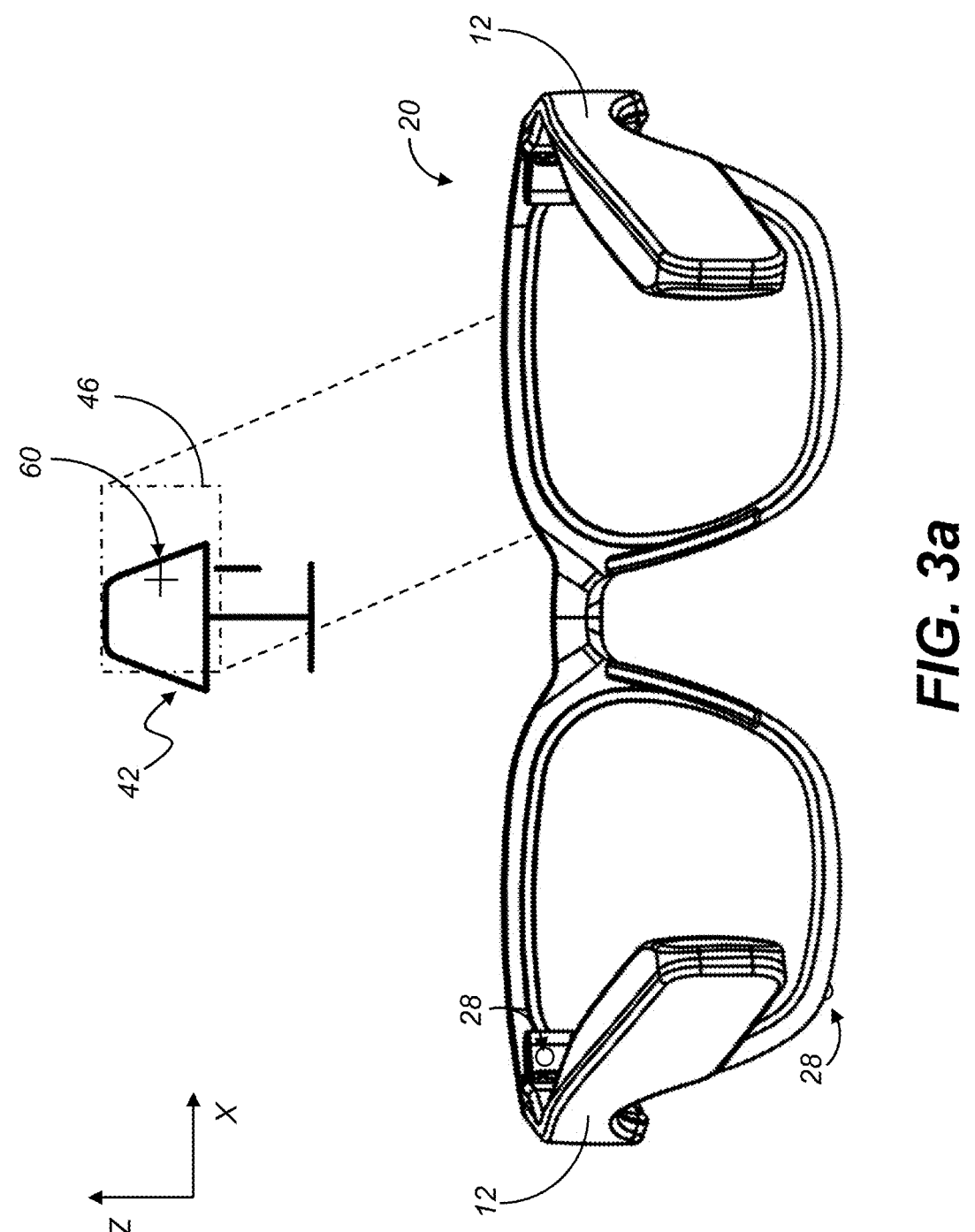
FIG. 3a illustrates a schematic of a real world object, as viewed through a head mounted near-eye display system, and a reticle appearing at optical infinity visually superimposed over the real world object, according to an exemplary embodiment of the presently disclosed subject matter.

As illustrated in the embodiment in FIG. 3a, a reticle 60 is enabled. The virtual image 46 comprises the reticle 60, the reticle 60 appearing superimposed over the real world object 42. In this example, reticle 60 appears in the center of the virtual image 46 and indicates the center of focus for the camera 22 without obscuring the view of the operator 10.

In an embodiment, the reticle 60 may be moved to different orientations in the FOV by the operator 10 via a user input button 14, touch sensor 16, voice commands, facial gestures or movements captured by the operator-facing camera 28, or other input options. In another embodiment, the reticle 60 may be paired to the eye or eyes of the operator 10, wherein the reticle 60 may be moved in accordance with an eye tracker or gaze tracker in the operator-facing camera 28 which measures movement and/or rotation of a user's eye(s). In an embodiment, the reticle 60 will remain in its assigned location until again moved by the operator 10.

In an embodiment, multiple reticles may be generated and operated independently from the first reticle 60. For example, a second reticle 62 may appear to the same eye of the observer 10 as the first reticle 60, or to the other eye of the observer or operator 10 as illustrated in FIG. 3c.

Figure 3B:
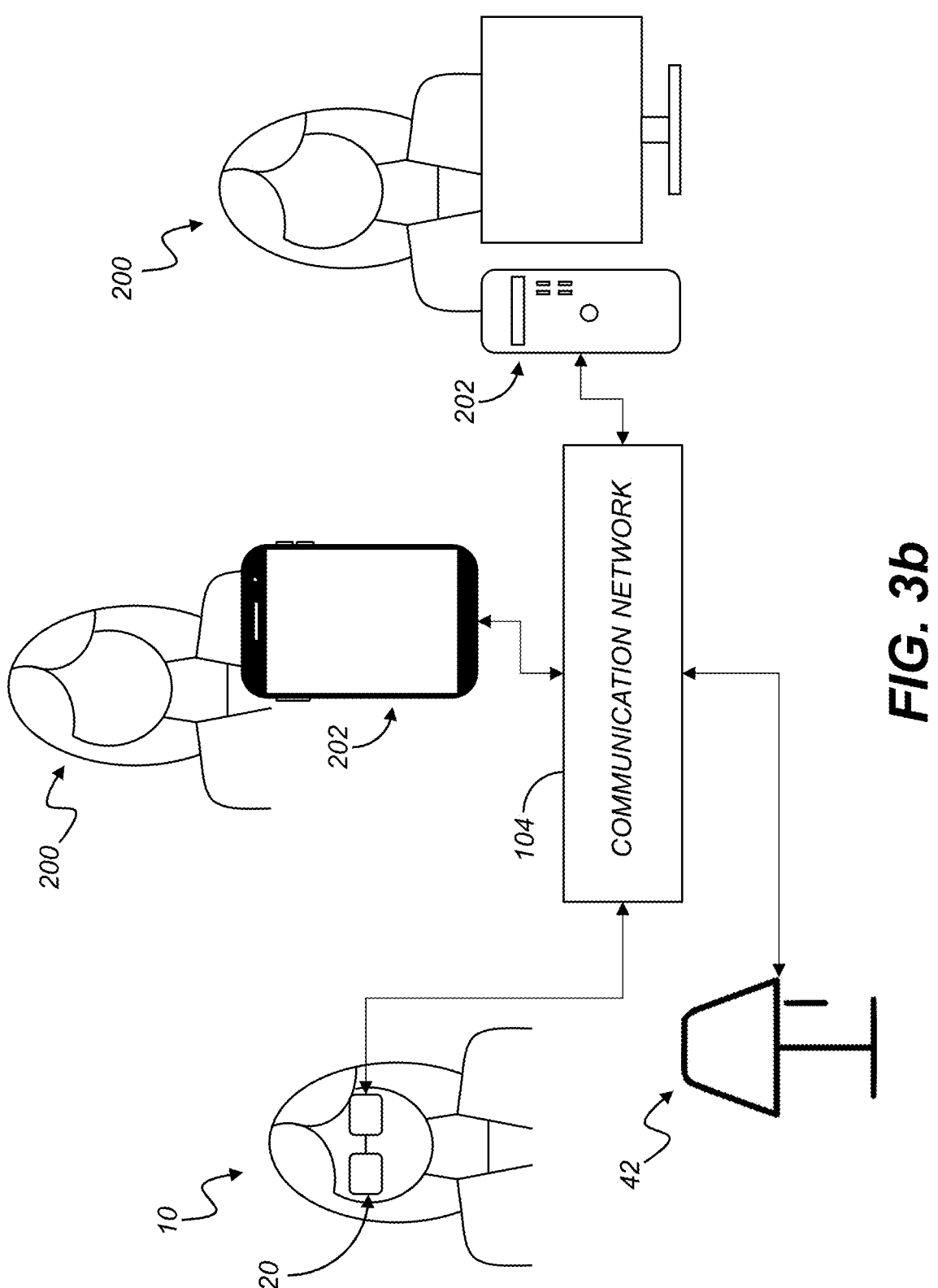
FIG. 3b is a schematic of a head mounted near-eye display system having a remote device connected thereto through a communication network according to an exemplary embodiment of the presently disclosed subject matter.
Figure 3C:
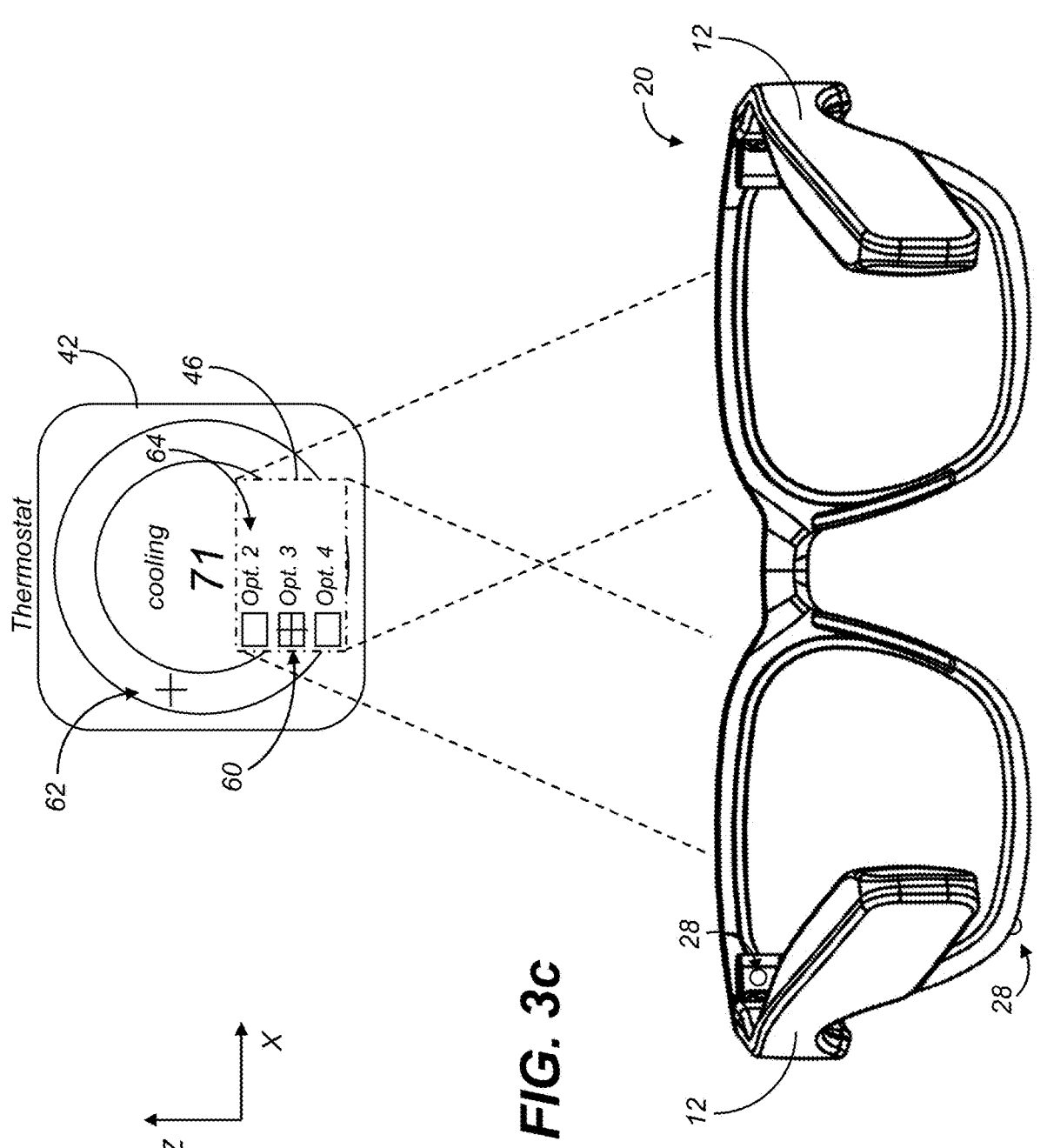
FIG. 3c illustrates a schematic of a virtual menu as conveyed via the waveguide in the right and left eye assemblies of a head mounted near-eye display system, and a reticle visually superimposed over a menu option, according to an exemplary embodiment of the presently disclosed subject matter.

Referring now to FIG. 3b, in an embodiment, the head mounted near-eye display system 20 may be connected with a device 202 operated by a remote party 200, such that the remote party 200 is capable of viewing data being received by the camera 22 and transmitted by the head mounted near-eye display system 20. The head mounted near-eye display system 20 and the remote device 202 may connect via a communications network 104 such as, but not limited to, a LAN, a WAN (e.g., the internet), a public network, and/or a private network. For example, the remote party 200, such as a technical specialist, may connect a computer 202 having a display with the head mounted near-eye display system 20 to view the image and/or video data transmitted by the head mounted near-eye display system 20 used by the operator 10. The operator 10 may enable the remote party 200 to assume control of the shape or form of the reticle 60, for example, to change the shape of a bounding box 80, and other characteristics of reticle 60, and move the reticle 60 to different positions within the virtual image 46. In an embodiment the remote party 200 may also execute commands with the reticle 60, including but not limited to, capturing images (i.e., photography), recording video, scanning bar codes, interacting with networked real world objects 42, and interacting with items within the virtual image 46. In an embodiment, the remote operator 200 may annotate the virtual image 46 utilizing the reticle 60. For example, the remote operator 200 may draw lines and/or arrows utilizing the reticle 60 to identify the one or more features within the virtual image 46. In an embodiment, the head mounted near-eye display system 20 is operable to match/synchronize the x-coordinates and the y-coordinates of the remote operator's input device (e.g., computer mouse) with the x-coordinates and the y-coordinates of the virtual image 46, enabling the remote operator 200 to control the reticle 60 within the virtual image 46. In an embodiment, two or more remote parties 200 may view the image and/or video data transmitted by the head mounted near-eye display system 20 in real time.

The reticle 60 may be visually superimposed over the real world object 42. In an embodiment, the operator 10 is operable to select or interact with the real world object 42 (also referred to herein as a network-connected device) by lingering the gaze of the operator 10, and the reticle 60, over the real world object 42 for a fixed amount of time. In another embodiment, the operator 10 is operable to select or interact with the real world object 42 by positioning the reticle 60 upon the real world object 42 and depressing the user input button 14, operating the touch sensor 16, inputting one or more voice commands, facial gestures or movements captured by operator-facing camera 28, or other input options. The nature of the interaction with a real world object 42 is defined by an integration with an associated computer program or application (i.e., app.). For example, the head mounted near-eye display system 20 and reticle 60 may be used for controlling a smart device like a personal home assistant, door lock, lighting, environmental temperature control, refrigerator, entertainment devices, vehicle entry, vehicle controls, printer, elevator and the like.

In another embodiment, the interaction may include designating a real object, like a stylus, a finger or fingers, a hand or hands, a baton, a ring, gloves and the like, that becomes actuable to take the place of the reticle 60. In an embodiment, connection of the real object, such as a stylus, a baton, a ring, or gloves, is accomplished by entering a serial number or code of the real world object into a software application of the head mounted near-eye display system 20. In an embodiment, the software application of the head mounted near-eye display system 20 is the Vuzix Companion application, which is incorporated herein by reference in its totality. In another embodiment, connection of the real object to the head mounted near-eye display system 20 is accomplished via Bluetooth connection. In still another embodiment, assigning the reticle 60 to a real object such as a finger or hand includes identifying/selecting the real object with the camera 22 and a user input, whereafter the real object is tracked by the camera 22 via a computer vision technique such as object recognition. For example. the reticle 60 may be assigned to an object such as a finger or stylus such that movement of the object corresponds to (i.e., causes) movement of the reticle 60. In an exemplary embodiment where the reticle 60 is assigned to an object, the virtual reticle 60 may be hidden or deemphasized (e.g., reduced in size or changed in color).

In an embodiment, the head mounted near-eye display system 20 is operable to map the coordinates of interactable real world objects 42 for later, and/or real-time, identification of the real world objects 42. Mapping the coordinates of interactable real world objects 42 enables the head mounted near-eye display system 20 to identify the real world object 42 upon which the reticle 60 is positioned, such that upon receiving observer input, the real world object 42 is operated. For example, the head mounted near-eye display system 20 may be utilized to map the coordinates of wirelessly controllable lighting devices. When the reticle 60 is located over a mapped wireless lighting device, the observer 10 may activate/deactivate the wireless lighting device via an input method described herein.

In another embodiment, the head mounted near-eye display system 20 is operable to connect with and identify interactable real world objects 42 via RFID tags and/or a QR code having a unique identifier (e.g., URL) located on/in the real world objects 42. For example, the head mounted near-eye display system 20 may identify a wireless lighting device upon which the observer 10 has positioned the reticle 60 via an RFID tag signal and activate/deactivate the wireless lighting device via an input method described supra. In an embodiment utilizing RFID tagged interactable real world objects 42, the head mounted near-eye display system 20 includes a RFID reader.

In another embodiment, the head mounted near-eye display system 20 is operable to recognize interactable real world objects 42 via a computer vision technique such as object recognition. For example, the camera 22 of the head mounted near-eye display system 20 may transmit video sequences to the processing unit 18 for real time processing to identify interactable real world objects 42. In an embodiment, the head mounted near-eye display system 20 may utilize edge detection in processing the images and/or video sequences captured by the camera 22.

Referring now to FIG. 2a, in an embodiment, a real world object 42 captured by the camera 22 is displayed as a virtual image 46 visually superimposed over the real world object 42. Upon receiving an input signal from the operator 10 to interact with the real world object 42, the head mounted near-eye display system 20 may display an animation of the virtual image 46 to visually indicate to the operator 10 that an interaction is being, or has been, performed. For example, where the real world object 42 comprises a table lamp, the animation visually indicating an interaction may include actuation of a pull-chain switch as indicated by the double-headed arrow in FIG. 2a.

In an embodiment, interacting with a real world object 42 may pin the reticle 60 to that object wherein the reticle 60 remains fixed to said object for a fixed amount of time. In another embodiment, the reticle 60 remains pinned to said real world object 42 even if it falls outside the FOV of the operator 10, until contact with the real world object 42 is ended by the operator 10, for example.

As illustrated in FIG. 3c, the reticle 60 may be positioned over a virtual object 64 in a virtual menu, for example, to select or interact with the virtual object 64 by lingering the gaze of operator 10 upon the virtual object 64 for a fixed amount of time, operating the user input button 14, the touch sensor 16, one or more voice commands, one or more facial gestures or movements captured by operator-facing camera

28, or other input options, while the reticle 60 is positioned on the virtual object 64. The nature of the interaction with the virtual object 64 is defined by an integration with an associated computer program or software application. For example, the virtual object 64 may include menu options, augmented reality elements, virtual reality elements, or any other selectable and/or interactive virtual items.

Figure 3D:
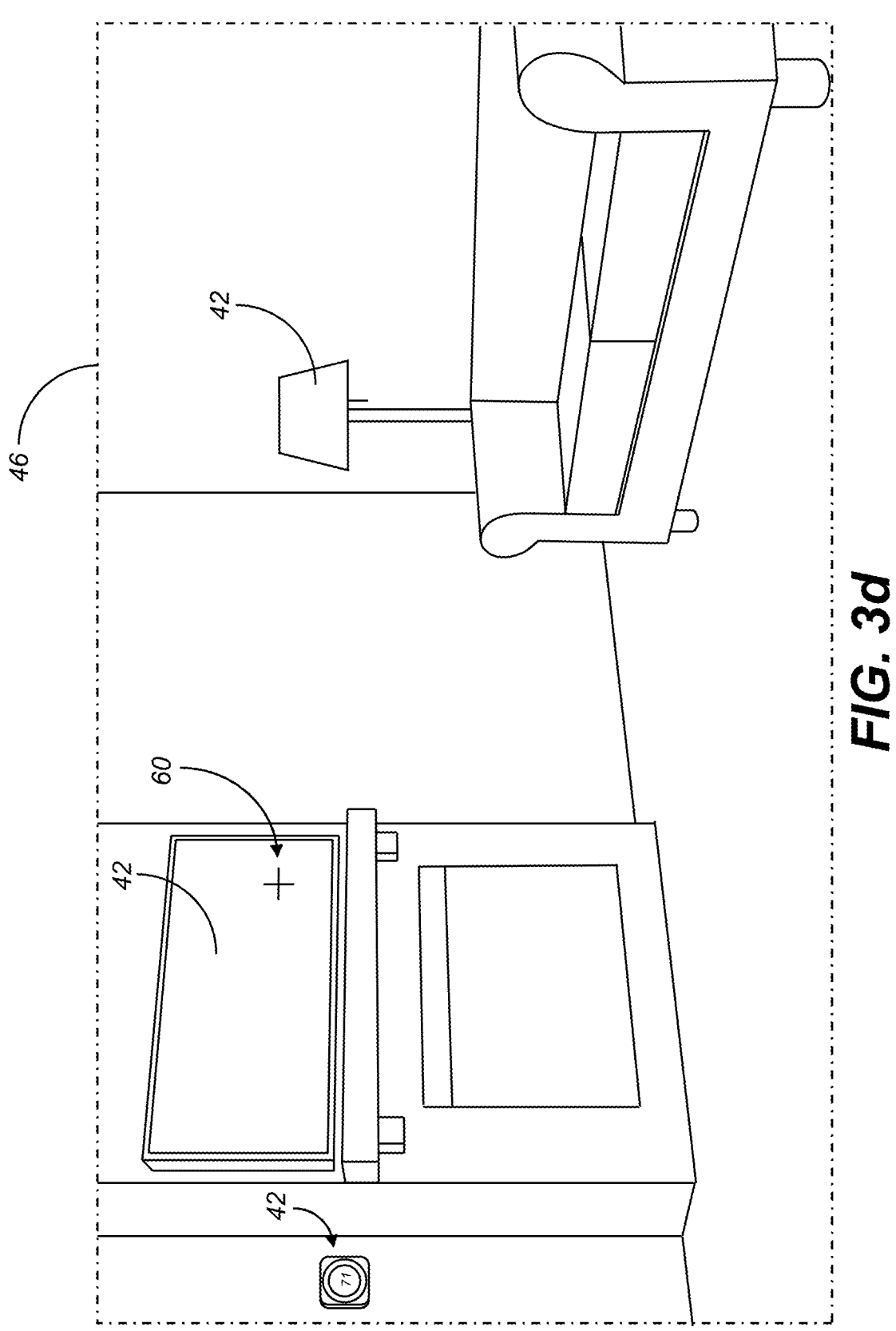
FIG. 3d illustrates a schematic of a virtual image including one or more network-connected devices and a reticle visually superimposed over a network-connected device according to an exemplary embodiment of the presently disclosed subject matter.
Figure 3E:
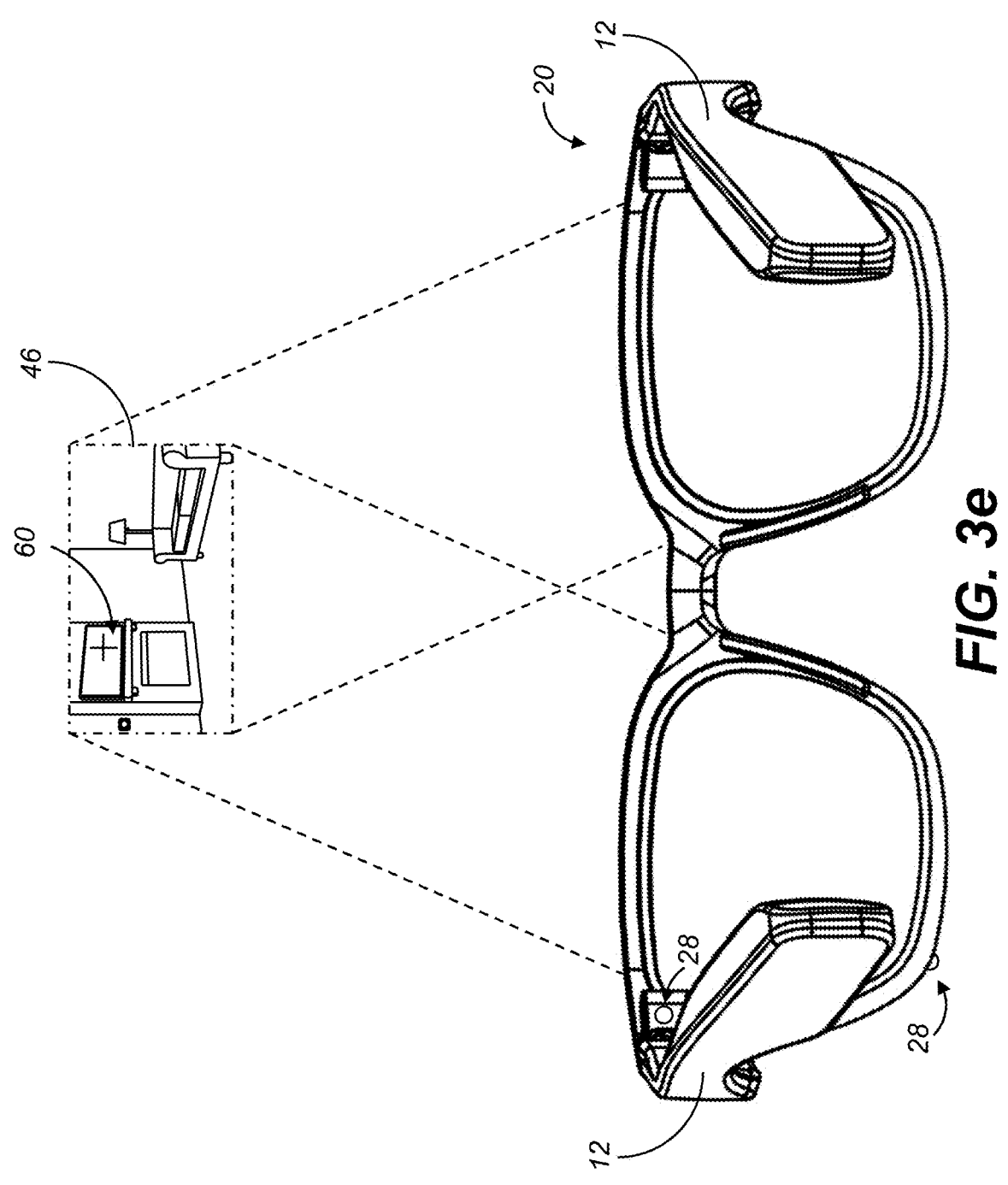
FIG. 3e illustrates a schematic of a virtual image according to FIG. 3d as conveyed via the waveguides in the right and left eye assemblies of a head mounted near-eye display system, and a reticle visually superimposed over a network-connected device, according to an exemplary embodiment of the presently disclosed subject matter.

As illustrated in FIGS. 3d and 3e, in an embodiment, the head mounted near-eye display system 20 is operable to remotely connect to networked real world objects and devices 42 to enable remote control of one or more states of the networked real world objects and devices 42 via the reticle 60. For example, the head mounted near-eye display system 20 is operable to display a virtual image 46 of a room in the home of the operator 10. The operator 10 is able to navigate the reticle 60 within the virtual image 46 to select a networked device 42 via the input device 16. In this way, the operator 10 is able to turn network connected lights on and off, adjust a network connected thermostat setting, and/or control a state of a network connected television from a location inside and outside of their home. For example, the head mounted near-eye display system 20 is operable to communicate with networked real world objects and devices 42 via a local area network (LAN), wireless local area network (WLAN), personal area network (PAN), and/or wide area network (WAN). In an embodiment, the virtual image 46 of the room in the home of the operator 10 displayed by the head mounted near-eye display system 20 is a static image. For example, the virtual image 46 may be a still image captured by the camera 22 during a process of connecting the head mounted near-eye display system 20 with networked devices 42. In another embodiment, the virtual image 46 of the room in the home of the operator 10 displayed by the head mounted near-eye display system 20 is a real-time image and/or video. For example, the virtual image 46 may be a real-time video captured by a camera located at the remote location.

Figure 4A:
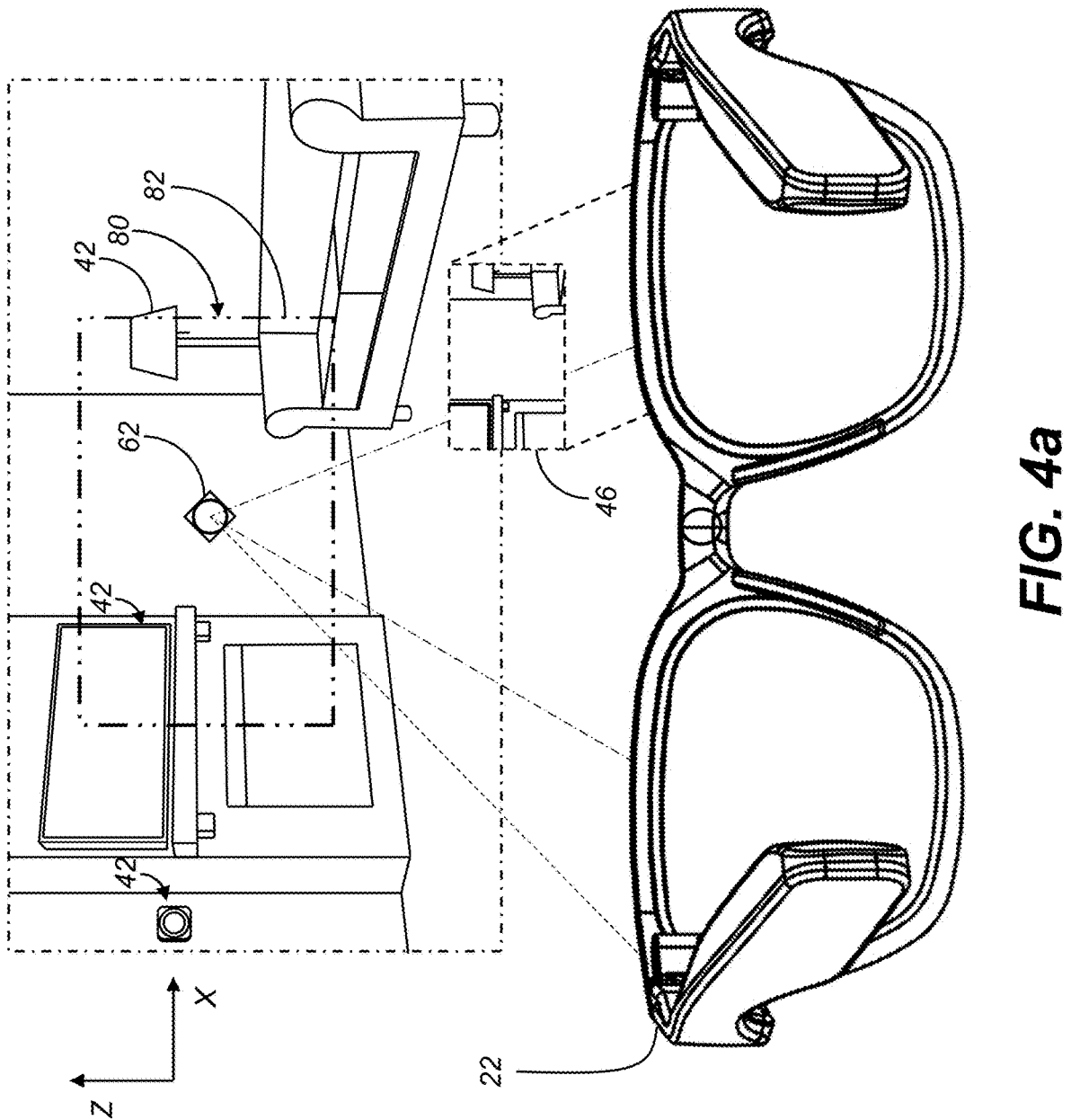
FIG. 4a illustrates a schematic of real world objects, as viewed through a head mounted near-eye display system, and a virtual bounding box visually superimposed over and/or around the real world objects, according to an exemplary embodiment of the presently disclosed subject matter.

Referring now to FIG. 4a, the head mounted near-eye display system 20 software enables the reticle 60 to take the form of a bounding box 80. In this embodiment, when enabled, the bounding box 80 displays a shape, such as a rectangle, that defines the zoom boundary 82 of the FOV of the camera 22. In other embodiments, the bounding box 80 may display as a square, circle, oval or other shape. In an embodiment, the bounding box 80 may be one or more of a plurality of colors, shadings, border weights and gradient shadings, and may include an assistive element such as a second reticle 62 or various camera FOV composition indicators, such as lines of sight, rule of thirds grid, center lines, and the like. Bounding box 80 may also be used to scan a bar code or QR code. If the bounding box 80 is configured to reflect the exact position of the camera 22, scanning of such bar codes and QR codes may be improved.

Figure 4B:
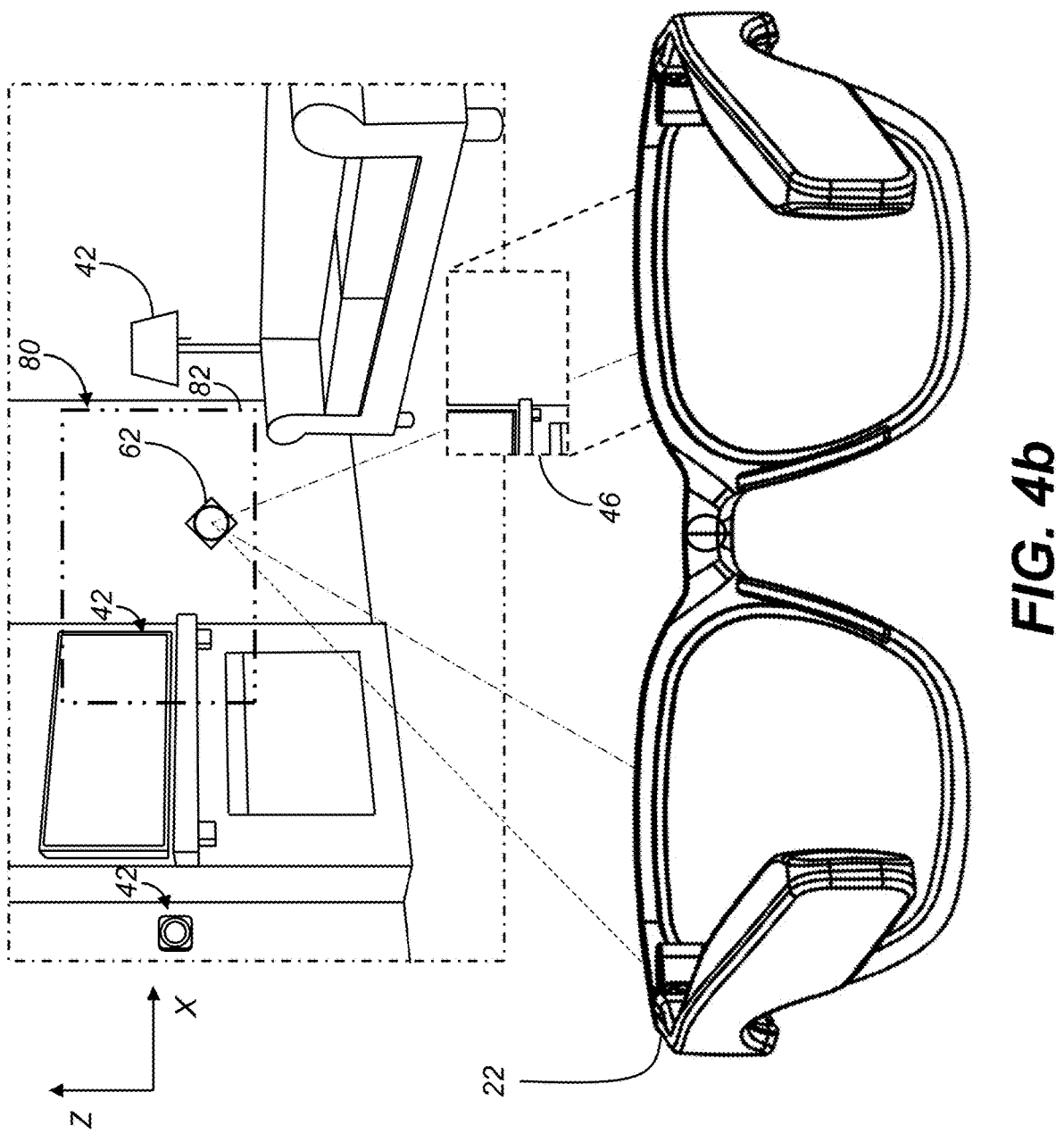
FIG. 4b illustrates a schematic of real world objects, as viewed through a head mounted near-eye display system, and a virtual bounding box visually superimposed over and/or around the real world objects indicating a narrowed field of view boundary of a camera, according to an exemplary embodiment of the presently disclosed subject matter.

As illustrated in FIG. 4b, bounding box 80 may change size proportional to the zoom boundary 82.

Figure 5:
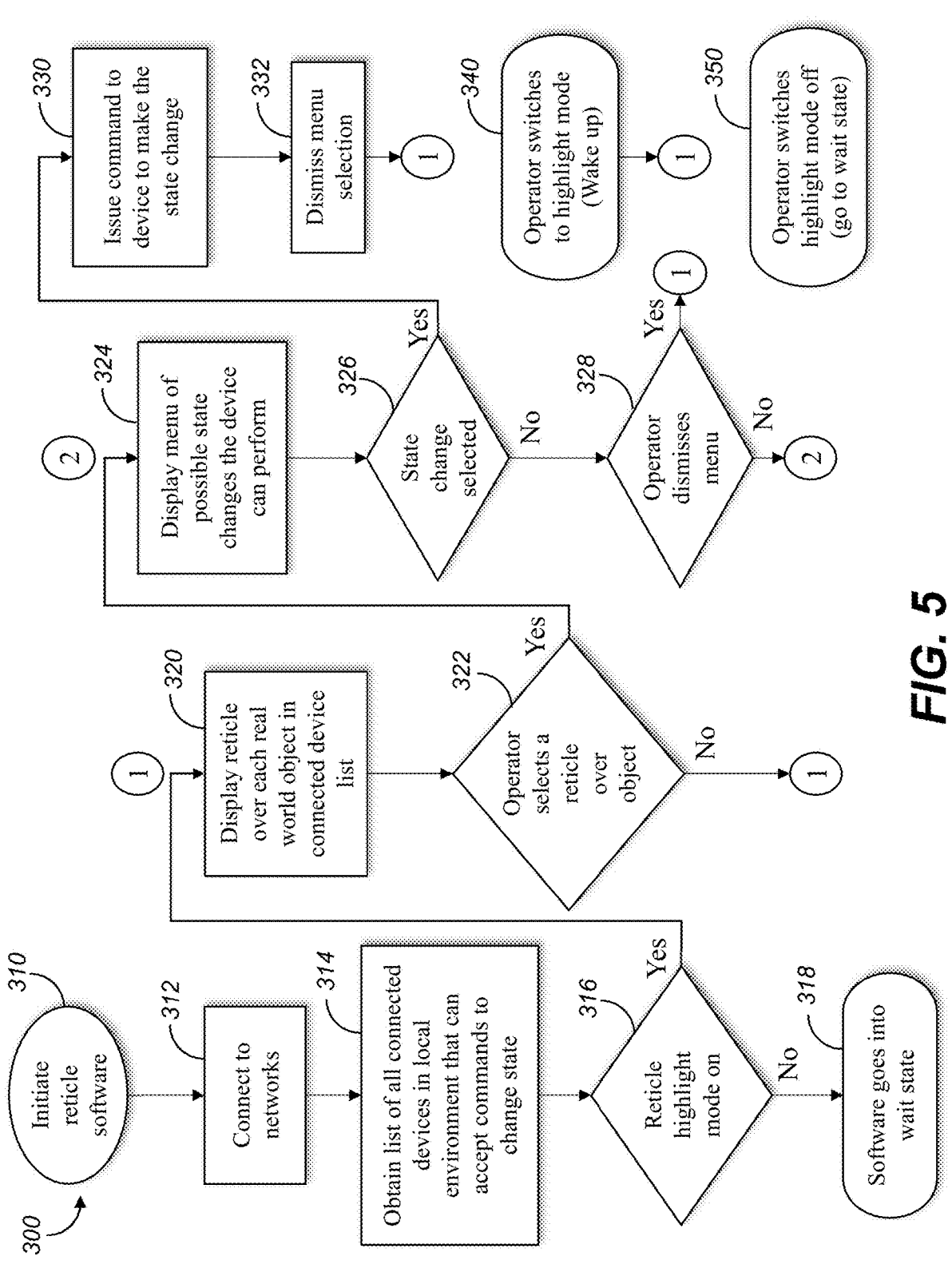
FIG. 5 is a flow diagram and method for reticle interaction with real world objects via a head mounted near-eye display system according to an exemplary embodiment of the presently disclosed subject matter.
Figure 6:
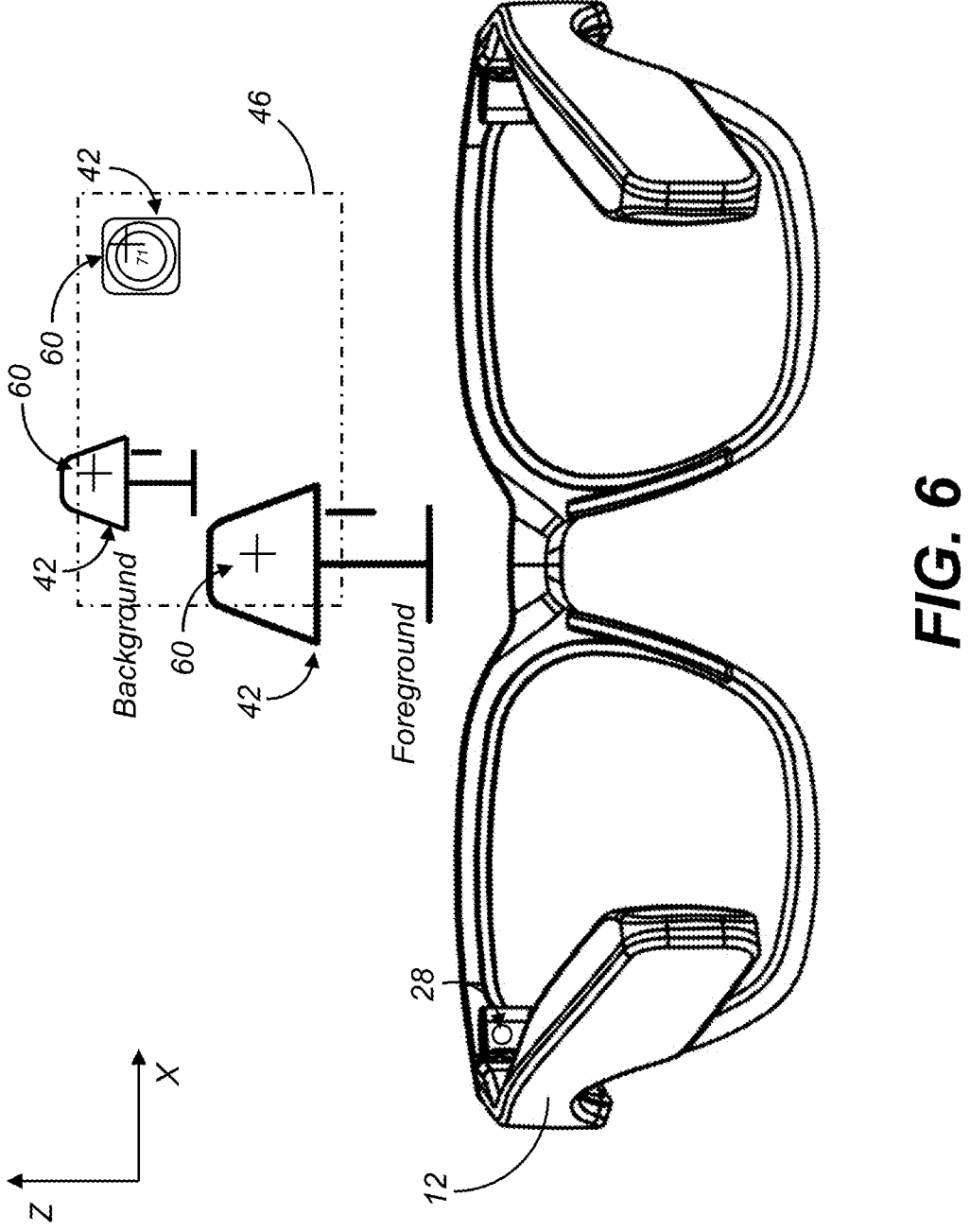
FIG. 6 illustrates a schematic of a plurality of real world objects, as viewed through a head mounted near-eye display system, with a reticle appearing at optical infinity visually superimposed over the plurality of real world objects, according to an exemplary embodiment of the presently disclosed subject matter.

FIG. 5 is a flow diagram 300 illustrating one method for using a reticle 60, 62 herein disclosed for interacting with real world objects 42. In step 310 the reticle software is initiated. In step 312, the reticle software searches for network connections accessible to the head mounted near-eye display system 20. In the next step 314 the reticle software obtains a list of all the network connected devices in the local environment of the operator 10 that can change state. Examples of such network connected devices include personal home assistants, door locks, lighting, temperature controls, refrigerators, entertainment devices, vehicle entry and vehicle controls, printer, elevators etc. In one embodiment, only those devices that the operator 10 is authorized to interact with is obtained. In one embodiment, the list of network connected devices includes devices that the operator 10 has authorization to change state and are not local to the current position of the operator 10. In one embodiment, the operator 10 may select to have local and/or non-local devices listed. In decision step 316 the reticle software determines whether reticle highlighting mode is turned on or turned off. If reticle highlight mode is turned off (or inactive), then the reticle software goes into a sleep mode. Sleep mode refers to a state of the reticle software that allows the operator 10 to continue operating head mounted near-eye display system 20 without the reticle software performing any further significant interactions with the operator 10 until operator 10 initiates a reticle software command. If in decision step 316 the reticle highlighting mode is on (or active), then the method 300 passes to step 320. As shown in FIG. 6, step 320 displays to the operator 10 reticles 60 over each of the real world devices 42 that are connected to a network and can have their state changed. In one embodiment, the reticle 60 is a pointing type reticle. In another embodiment, the reticle 60 is a bounding box type reticle 80 over and/or located around at least a portion of the real world object 42 as seen by the operator 10. Decision step 322 is then entered and the operator 10 may select one of the devices 42 by selecting one of the reticles 60 displayed to the operator. Step 324 is then entered and the reticle software displays a list of states that the selected device 42 may have. The operator 10 may choose from this list the state into which the operator 10 wishes to put the device 42 into. Decision step 326 is entered to determine if the operator 10 has selected to change the current state of the device 42. If the operator 10 has selected not to change the state of the device 42, decision step 328 is entered to determine if the operator 10 wishes to dismiss the state options list. If the menu is not to be dismissed, then flow is passed to step 324. If the list of states for the device 42 is dismissed flow is passed to step 320. In decision step 326, if the operator 10 has selected to change the current state of the device 42, flow is passed to step 330. In step 330 the reticle software forms and issues the command to change the state of the selected device 42. In step 332, the menu of possible device 42 states is dismissed, no longer displayed to the operator 10. Flow is passed to step 320. At any time, the operator 10 may switch the reticle software into a highlight mode or turn off the highlight mode. This toggles whether or not the reticles 60 are displayed over the real world objects 42 in the environment of the operator 10. Step 340 toggles the highlight mode on. Step 350 toggles the highlight mode off.

Figure 7:
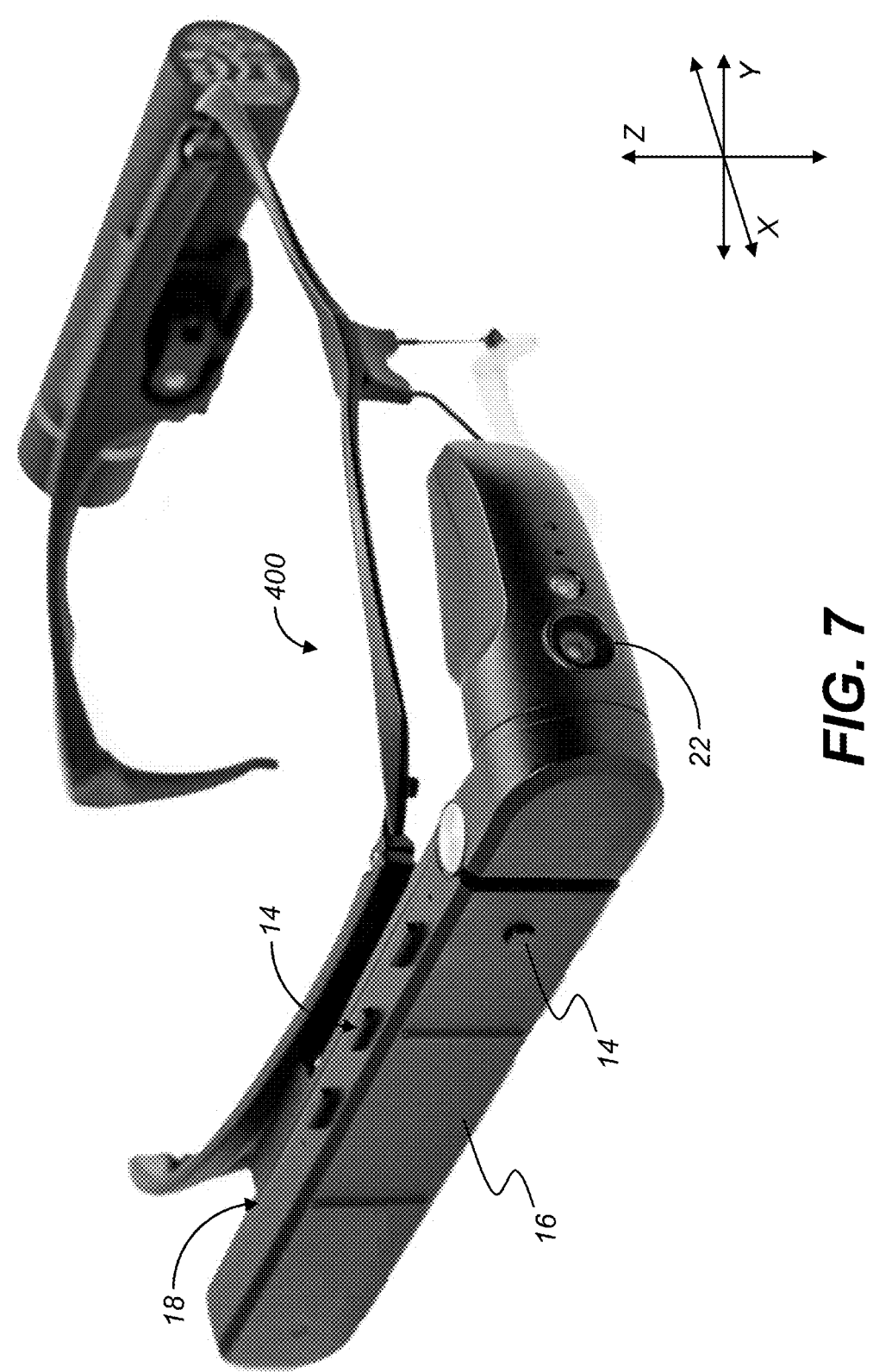
FIG. 7 illustrates a schematic of a head mounted near-eye display system driven by micro-display technologies according to an exemplary embodiment of the presently disclosed subject matter.

The head mounted near-eye display system 20 has been described herein as utilizing one or more optically transparent flat parallel plate waveguides 100 having one or more diffractive optics. However, embodiments of the presently disclosed subject matter may be utilized with head mounted near-eye display systems that are not optically transparent, such as the head mounted near-eye display system 400 illustrated in FIG. 7.

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:

1. A head-mounted near-eye display system for controlling a network-connected device, comprising:
    an image source operable to form a reticle within a virtual image;
    an image light guide operable to convey said virtual image to an eyebox;
    a processing unit operable to remotely connect with said network-connected device, wherein said network-connected device is operable to receive commands to change state over said network; and
    a user input mechanism operable to control said reticle such that said reticle may be visually superimposed over said network-connected device;
    wherein said user input mechanism is operable to navigate said reticle within said virtual image such that said reticle is visually superimposed over said network-connected device, whereby said state of said network-connected device is operable to be changed.

2. The system of claim 1, wherein said network-connected device changes state when said reticle is visually superimposed over said network-connected device for a predetermined period of time.

3. The system of claim 1, further comprising a menu formed within said virtual image, said menu having a plurality of selectable options associated with said network-connected device, wherein said reticle is operable to be visually superimposed over one or more of said options, and wherein said reticle is operable to select or deselect one or more of said options to change said state of said network-connected device.

4. The system of claim 1, further comprising:
    a camera arranged to capture images of said network-connected device, wherein said
    processing unit is in communication with said camera and said image source; and
    a waveguide is arranged to convey said images of said network-connected device to an eyebox,
    wherein said waveguide is arranged to convey an animated virtual image of said network-connected device to said eyebox to visually indicate a change of state of said network-connected device.

5. The system of claim 1, further comprising a camera or other visual input device, wherein said reticle is a bounding box representing said camera or other visual input device field of view, wherein said bounding box is operable to be aligned with a bar code or QR code to scan an associated item or device.

6. The system of claim 1, wherein said reticle is assigned to a real-world object, wherein movement of said reticle corresponds to movement of said real-world object.

7. The system of claim 1, wherein said reticle is operable to select, deselect, control or otherwise affect a virtual menu or other selectable virtual object.

8. The system of claim 1, wherein said reticle is a first reticle, further comprising a second reticle arranged to operate together with or independently of said first reticle.

9. The system of claim 1, wherein said reticle is operable to activate, deactivate, control or otherwise change said state of a plurality of network-connected devices.

10. The system of claim 1, wherein said user input mechanism comprises a user input button or a touch sensor.

11. The system of claim 1, wherein said processing unit operable to map coordinates of network-connected devices, whereby said network-connected devices are identifiable when said reticle is visually superimposed over said network-connected devices.

12. The system of claim 1, further comprising an RFID reader operable to identify network-connected devices, whereby said network-connected devices are identifiable when said reticle is visually superimposed over said network-connected devices.

13. The system of claim 1, wherein said processing unit operable to identify network-connected devices via a computer vision technique, whereby said network-connected devices are identifiable when said reticle is visually superimposed over said network-connected devices.

14. The system of claim 1, further comprising a camera, wherein said processing unit in signal communication with said camera and said user input mechanism, wherein said processing unit is operable to connect with a remote device, whereby a remote party can view data received by said camera.

15. The system of claim 1, wherein said image light guide comprises a waveguide operable to convey said virtual image, and wherein said virtual image comprises said network-connected device.

16. The system of claim 15, wherein said virtual image is a static image or a real-time video of a room within which one or more network-connected devices are located.

17. The system of claim 1, wherein said user input mechanism comprises a voice command or an operator-facing camera operable to capture a facial gesture or movement.

18. A head-mounted near-eye display system for controlling a network-connected device, comprising:

an image source operable to form a reticle within a virtual image; and a user input mechanism operable to control said reticle such that said reticle may be visually superimposed over said network-connected device;

wherein said network-connected device is operable to receive commands to change state over said network;

wherein said user input mechanism is operable to select said network-connected device when said reticle is visually superimposed over said network-connected device, whereby said state of said network-connected device is operable to be changed;

wherein said reticle is assigned to a real-world object, wherein movement of said reticle corresponds to movement of said real-world object.

19. The system of claim 18, wherein said real-world object is a user's hand or a stylus.

20. A head-mounted near-eye display system for controlling a network-connected device, comprising:

an image source operable to form a reticle within a virtual image;

a camera arranged to capture an image of said network-connected device;

a processing unit in communication with said camera and said image source;

an image light guide operable to convey said virtual image and said image of said network- connected device to an eyebox; and a user input mechanism operable to control said reticle such that said reticle may be visually superimposed over said network-connected device, whereby said network- connected device is operable to receive commands to change state over said network;

wherein said user input mechanism is operable to select said network-connected device when said reticle is visually superimposed over said network-connected device, and wherein said image light guide is arranged to convey an animated virtual image of said network-connected device to said eyebox to visually indicate a change of state of said network-connected device.

* * * * *